United States Patent [19]

Arntzen

[11] Patent Number: 5,195,217

[45] Date of Patent: Mar. 23, 1993

[54] LOAD-ADJUSTABLE BREAKABLE SAFETY DEVICE

[76] Inventor: Sven Arntzen, 8090 Atlantic Blvd., E-87, Jacksonville, Fla. 32211

[21] Appl. No.: 899,006

[22] Filed: Jun. 15, 1992

Related U.S. Application Data

[63] Continuation of Ser. No. 650,433, Feb. 4, 1991, abandoned.

[30] Foreign Application Priority Data

Mar. 16, 1990 [NO] Norway .................................. 901245

[51] Int. Cl.$^5$ ............................................. F16G 11/00
[52] U.S. Cl. ..................................... 24/115 F; 24/602
[58] Field of Search ............. 24/115 F, 20 R, 23 EE, 24/704.1, 602, 129 D, 129 B; 59/78, 79.1, 93; 119/96, 106, 109; 43/44.83.42.49; 403/2

[56] References Cited

U.S. PATENT DOCUMENTS

| | | | |
|---|---|---|---|
| 3,429,199 | 2/1969 | Kenyon | 403/2 X |
| 3,995,598 | 12/1976 | Gardner et al. | |
| 4,035,092 | 7/1977 | Adams, Jr. | 403/2 |
| 4,200,190 | 4/1980 | Tyson | 24/129 B X |
| 4,352,382 | 10/1982 | Weidler | 403/2 X |

FOREIGN PATENT DOCUMENTS

| | | | |
|---|---|---|---|
| 2053832 | 11/1972 | Fed. Rep. of Germany | 403/2 |
| 1445539 | 6/1966 | France | 24/20 R |

*Primary Examiner*—James R. Brittain
*Attorney, Agent, or Firm*—Hedman, Gibson & Costigan

[57] ABSTRACT

Breakable safety device, comprising a body (1) with alternating securing points (2, 3, 4, 5) and zones of weakness (6, 7, 8) where the zones of weakness are given successively increasing/decreasing breaking strength. A field of using such safety devices are when exercising dogs from a bike.

5 Claims, 1 Drawing Sheet

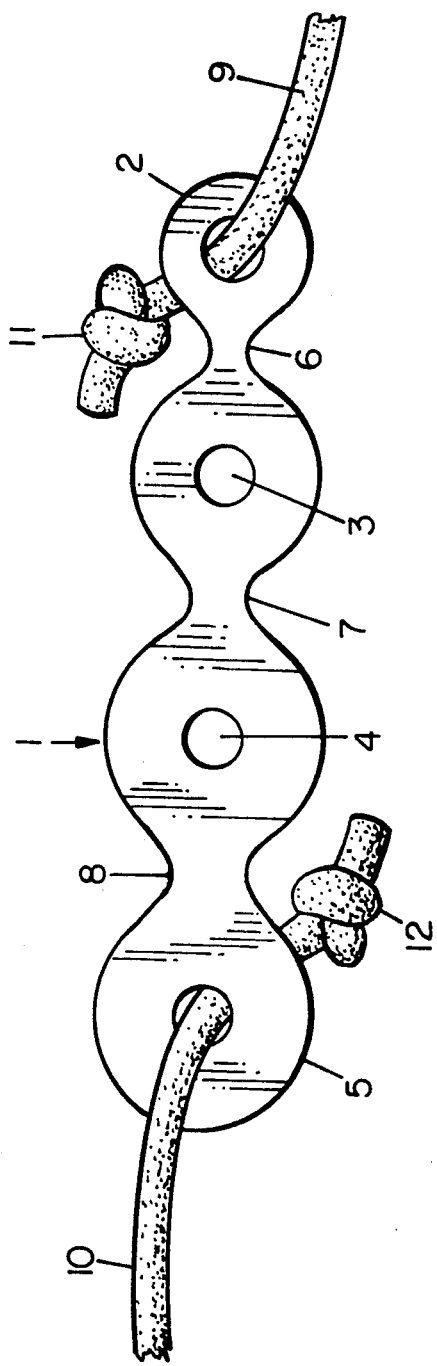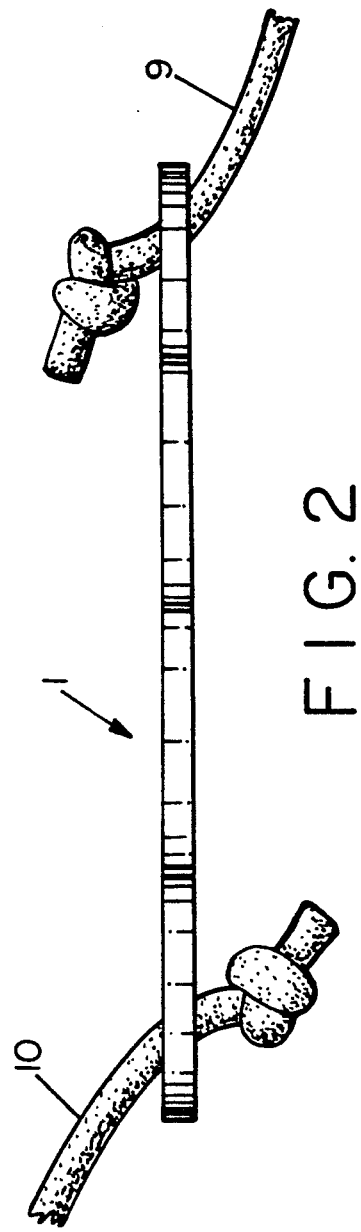

LOAD-ADJUSTABLE BREAKABLE SAFETY DEVICE

REFERENCE TO RELATED APPLICATION

The present application is a continuation of U.S. application Ser. No. 07/650,433, filed Feb. 4, 1991, now abandoned.

FIELD OF THE INVENTION

The present invention concerns an intermediate joint between objects, this intermediate joint being made to be broken at different loads.

BACKGROUND OF THE INVENTION

To ensure that too large loads between working parts by towing, lifting etc. do not occur, there is normally placed intermediate joints between the loaded parts, these joints breaking or fragmenting above a certain load. Such breaking joints are usually of a throw-away type, and have the drawback that they can not be adjusted to different loads.

The purpose of the present invention is to produce such a breaking joint which simultaneously is adjusted to breaking at different loads.

The basis for the invention, and which includes a field of use for the freeing safety device according to the invention is the problem of exercising dogs by using a bicycle stand (see U.S. Pat. No. 4,854,269) where the weight and strength of the dogs being exercised, and the corresponding traits of the owner, varies very much. The variation of the maximum load before the dog is freed from the exercising stand represents in itself a problem since a liberating device with a function as described above for the previously known devices, would have to be produced in a variety of different sizes which would have to be sold and used separately. This represents a significant drawback and increased expenses when producing such stands.

SUMMARY OF THE INVENTION

As a solution for this problem there has according to the present invention been produced a safety releasing device comprising a narrowing body or a body with sections of stepwise lesser material thickness and/or material strength and/or sections of weakness, an where there between such sections are placed securing means for choosing each of the breaking strengths of the releasing device. Such a body may e.g. comprise a band, a pipe a rod or a series of continuously weaker rope sections which are successively secured to each other.

DESCRIPTION OF THE DRAWINGS

FIG. 1 is a front plant view of the preferred embodiment of the safety release device of the present invention.

FIG. 2 is a top plan view of an embodiment of the present invention.

DESCRIPTION OF THE PREFERRED EMBODIMENT

The figure shows a band 1, preferably of a synthetic material such as nylon, light metal or other suitable material, with stamped out or shaped apertures 2, 3, 4 and 5. The band 1 is alternately narrowed 6, 7, 8 to produce zones with successively lesser material strength, thus to produce potential breaking places or zones which are broken at different loads.

Such breaking zones may, however, also be produced in other ways, e.g. by alternating partwise cutting, alternating material types with successively lesser strength etc. Breaking zones 15, 14 and 13, shown in FIG. 3, are an alternative or complimentary embodiment of the body of the present invention with stepwise lesser material thickness.

In the figure there is also shown a possible securing for two ropes 9, 10 being threaded through the first and last holes 2, 5, and being prevented from slipping out of the holes by being knotted at each end 11, 12 of the ropes. In the location being shown in the figure a breaking will happen at the least possible load, and at successively larger loads as the end rope 9 is moved to the holes 3, 4 closer to the end hole 5.

The location of the ropes 9, 10 for the wanted breaking load may of course be performed according to the user's wish.

In a special embodiment for exercising dogs from a bike, as mentioned above, the safety releasing device according to the invention may be made of nylon plate material with a thickness of 1,5 mm and with a length of 85 mm. When using such an embodiment the breaking strength will, when using the hole arrangement 5-2 to secure the ropes 9, 10 as shown on the figure, be 30 kg, whereas it will successively increase to 45 kg and 57.5 kg when using the hole arrangement 5-3 or 5-4, respectively.

The present invention has in the above given disclosure been described with reference to a band with four holes and three zones of weakness, but it will be obvious to the person skilled in the art that more or fewer holes/zones of weakness may be used. It will also be obvious to the person skilled in the art that other securing devices than holes may be used, inter alia hooks, screws, pinchers, nails etc.

It will also be obvious that such safety devices may be used for other purposes than exercising dogs, and that this area is described only as an example.

Additionally, it is also obvious that other securing objects than ropes may be used with the safety device, e.g. wire, hawsers, rods, hooks, bolts, rings etc.

The safety device according to the invention may also be produced as an integrated part of objects whose correct function depend on and is limited by maximum loads.

I claim:

1. A load adjustable breakable device comprising a body having a plurality of securing sections to be engaged by securing means and a plurality of zones of weakness of lesser breaking strength than said securing sections for breaking when a predetermined force is exerted thereacross wherein the body comprises at least three apertured securing sections divided by and spaced from intermediate zones of weakness, and wherein the zones of weakness have successively decreasing breaking strengths in downstream adjacent zones of weakness separated by said spaced, apertured securing sections wherein independent securing means are adapted to engage the securing section adjacent the zone of weakness corresponding to a desired load capacity on the downstream side thereof and any securing section on the upstream side of the zone of weakness corresponding to the desired load capacity.

2. The breakable device according to claim 1, wherein the zones of weakness are narrowing zones.

3. The breakable device according to claim 1, wherein the body is made of a synthetic material.

4. The breakable device according to claim 3 wherein the body is made of nylon.

5. The breakable device according to claim 4, wherein the body has a thickness of 1.5 mm.

* * * * *